United States Patent [19]

Chevalley

[11] Patent Number: 5,222,069
[45] Date of Patent: Jun. 22, 1993

[54] MISCORRECTION ARRANGEMENT FOR THE CONCEALMENT OF MISDETECTED OR MISCORRECTED DIGITAL SIGNALS

[75] Inventor: Jim C. Chevalley, San Francisco, Calif.

[73] Assignee: Ampex Systems Corporation, Redwood City, Calif.

[21] Appl. No.: 586,490

[22] Filed: Sep. 20, 1990

[51] Int. Cl.⁵ ............................................. G11B 20/18
[52] U.S. Cl. ................................................. 371/40.3
[58] Field of Search ................ 371/37.4, 37.5, 37.7, 371/40.1, 40.3, 31

[56] References Cited

U.S. PATENT DOCUMENTS

| | | | |
|---|---|---|---|
| 4,546,474 | 10/1985 | Sako et al. | 371/37.5 |
| 4,653,052 | 3/1987 | Doi et al. | 371/37.4 |
| 4,680,764 | 7/1987 | Suzuki et al. | 371/37.7 X |

FOREIGN PATENT DOCUMENTS 156413  10/1985  European Pat. Off. ............ 371/37.5

OTHER PUBLICATIONS

Finck, R. et al., "Third-generation decoding ICs for CD players", Electronic Components and Applications, vol. 8, No. 3, 1988, pp. 145-152.
Reed Solomon Decoder, Model of CSD1038G, Product Description, Sony Corporation.

Primary Examiner—Stephen M. Baker
Attorney, Agent, or Firm—Richard J. Roddy

[57] ABSTRACT

With a digital audio or video recorder/playback decoder, an erasure flag signals (1) that an error(s) was not detected in a video signal or that an error(s) was detected and was corrected or (2) that an error(s) was detected and was not corrected. Decoders either (1) may not detect certain errors, called "unflagged errors," or (2) may detect certain errors but not correct those errors, called "flagged errors." Here, video signal data, which may have flagged or unflagged errors, is concealed. The structure detects an unflagged error in the digital data and modifies the concealment flag of that digital data. The structure also detects a first-good sample of digital data; sets the erasure flag of the first-good sample to indicate that it is to be treated as having a detected error; and extends the first-good sample to an ECC system and to a miscorrection detector. The first-good sample and a corresponding sample at the output of the ECC system are compared and (1), if the compared samples are the same, the structure modifies the concealment flag of the first-good sample to a "good" value or (2), if the compared samples are not the same, modifies the concealment flag of the first-good sample or the entire data block of which the good-sample is an element to a "bad" value dependent on whether the then existing concealment flag of the corresponding sample output is itself bad or good, respectively.

20 Claims, 5 Drawing Sheets

MISCORRECTION ARRANGEMENT FOR THE CONCEALMENT OF MISDETECTED OR MISCORRECTED DIGITAL SIGNALS

BACKGROUND OF THE INVENTION

1. Technical Field

This invention relates to error detection and correction and, more particularly, to an arrangement for detecting and concealing misdetected or miscorrected digital data such as may occur with digital video tape recorders and playback devices.

2. Description of the Prior Art

There are several digital videotape recorder and playback devices that can be found in the marketplace. It is known that, in such recorder/playback devices, a video digital signal, for example, a video digital signal having the well known 19 millimeter (mm), four times the frequency subcarrier (Fsc), also written as 4Fsc, digital composite format, also called the D-2 format, can be provided to a synchronization inner decoder. The inner decoder detects a synchronization pattern, for example, using the arrangement disclosed in U.S. Pat. No. 4,879,731 issued to R. K. Brush on Nov. 7, 1989 and entitled "Apparatus and Method for Sync Detection in Digital Data", and decodes and corrects the video digital signal using a Reed Solomon code arrangement, for example, using the arrangement disclosed in U.S. Pat. No. 4,597,083 issued to R. M. Stenerson on Jun. 24, 1986 and entitled "Error Detection and Correction in Digital Communication Systems". The inner decoder also provides an erasure flag and the decoded video digital signal to a frame memory and a segment memory.

The erasure flag can be a multivalued signal, for example, to indicate either (1) that no error was detected in the video digital signal and hence no error was corrected or that some maximum number of errors, for example, that one, two or three errors, were detected in the video digital signal and that the detected error or errors were corrected; or (2) that more than the maximum number of errors, for example, more than three errors, were detected in the video digital signal and that none of the detected errors was corrected. Accordingly, an erasure flag can be interpreted to flag or signal the event that, on the one hand, an error(s) was not detected in a video digital signal or that an error(s) was detected and was corrected; or that, on the other hand, an error(s) was detected and was not corrected in the video digital signal.

Commonly, the frame memory accepts video data, responsive to synchronization and identification information in the video digital signal, and thereupon buffers the video data so that the video data may be reformatted for outer decoding purposes. The frame memory also performs time base correction and provides facilities for freeze-frame, freeze-field, and other methods of operating upon the video digital signal. Also, signal conversion is typically done at an off-tape clocking rate. Thereupon, the video data is typically written into the frame memory and can later be read from the frame memory to the segment memory at the reference clocking rate, for example, at a rate of 2Fsc.

It is also known to extend the video data, which is typically read from the segment memory, to an outer decoder where outer code block columns of the video data are deshuffled and two or more video data channels are extended through an error correction code (ECC) outer decoding device. It is common that the decoding process corrects up to four flagged bytes per outer code block. After error correction, the video data and the corresponding erasure flags are written into a random access memory (RAM), sometimes called an intraline deshuffle memory. The writing into the RAM occurs in such a sequence that allows for subsequent intraline deshuffling of the video data. Thereafter, the deshuffled, corrected video data and concealment flags (viz-a-viz erasure flags) for indicating uncorrected data and, hence, for identifying video data that needs to be concealed are extended to a video error concealing device such as that disclosed in U.S. Pat. No. 4,792,953 issued to L. A. Pasdera and M. G. Lemoine on Dec. 20, 1988 and entitled "Digital Signal Error Concealment".

Unfortunately, the typical synchronization inner decoder, which includes an arrangement for detecting and correcting error(s), either (1) may not detect certain error(s) and hence does not correct those error(s), which can be called "unflagged errors", or (2) may detect certain error(s) but not correct those error(s), which can be called "flagged errors." It is also unfortunate that the typical outer decoder, which includes an arrangement for generally correcting flagged error(s) but not for correcting unflagged error(s), either (1) may not correct certain flagged error(s), which are then extended to a video error concealing device for concealment, or (2) may not correct unflagged error(s), which are then extended to the video error concealing device, but, unfortunately, are not concealed.

SUMMARY OF THE INVENTION

These and other problems are solved in accordance with the principles of my invention, which includes a method, a system and apparatus for concealing digital data. The arrangement includes checking a digital data signal for errors; and responsive to a detected error in the digital data, generating a corresponding erasure flag for indicating whether or not the detected error is to be corrected; and responsive to an erasure flag, generating a corresponding concealment flag for indicating whether or not the digital data is to be concealed; and extending the digital data and concealment flag to an error concealer. The arrangement also includes detecting an unflagged error in the digital data and, responsive to a detected unflagged error, modifying the concealment flag of the digital data. The arrangement further, responsive to the modified concealment flag, permits the concealing of the unflagged, yet detected, error in the digital data. The arrangement also allows for detecting the first-good sample of digital data; setting the erasure flag of the first-good sample to indicate that the first-good sample is to be treated as including a detected error; and extending the first-good sample to an error correcting code (ECC) system and to a miscorrection detector. The arrangement allows for comparing the first-good sample and a corresponding sample output of the ECC system and, on the one hand, responsive to the comparison of the first-good sample and the sample output of the ECC system indicating the compared samples to be the same, modifying the concealment flag of the sample to a "good" value; while, on the other hand, responsive to the comparison of the first-good sample and the sample output of the ECC system indicating that the compared samples are not the same and (a) responsive to the concealment flag of the corresponding sample output of the ECC system indicating that the sample output to be a "bad" value, modifying the concealment flag of the first-good sample to a "bad" value or (b) responsive to the concealment flag of the corresponding sample output of the ECC system indicating that the sample output to be a "good" value, modifying the concealment flag of the block including the first-good sample to a "bad" value. Thereupon, the arrangement allows the modified concealment flag to be extended to a signal concealer for concealment or non-concealment processing.

BRIEF DESCRIPTION OF THE DRAWING

These and other advantages of the present invention will become apparent from the following detailed description when taken in conjunction with the accompanying drawing in which.

DETAILED DESCRIPTION

Figure 1:
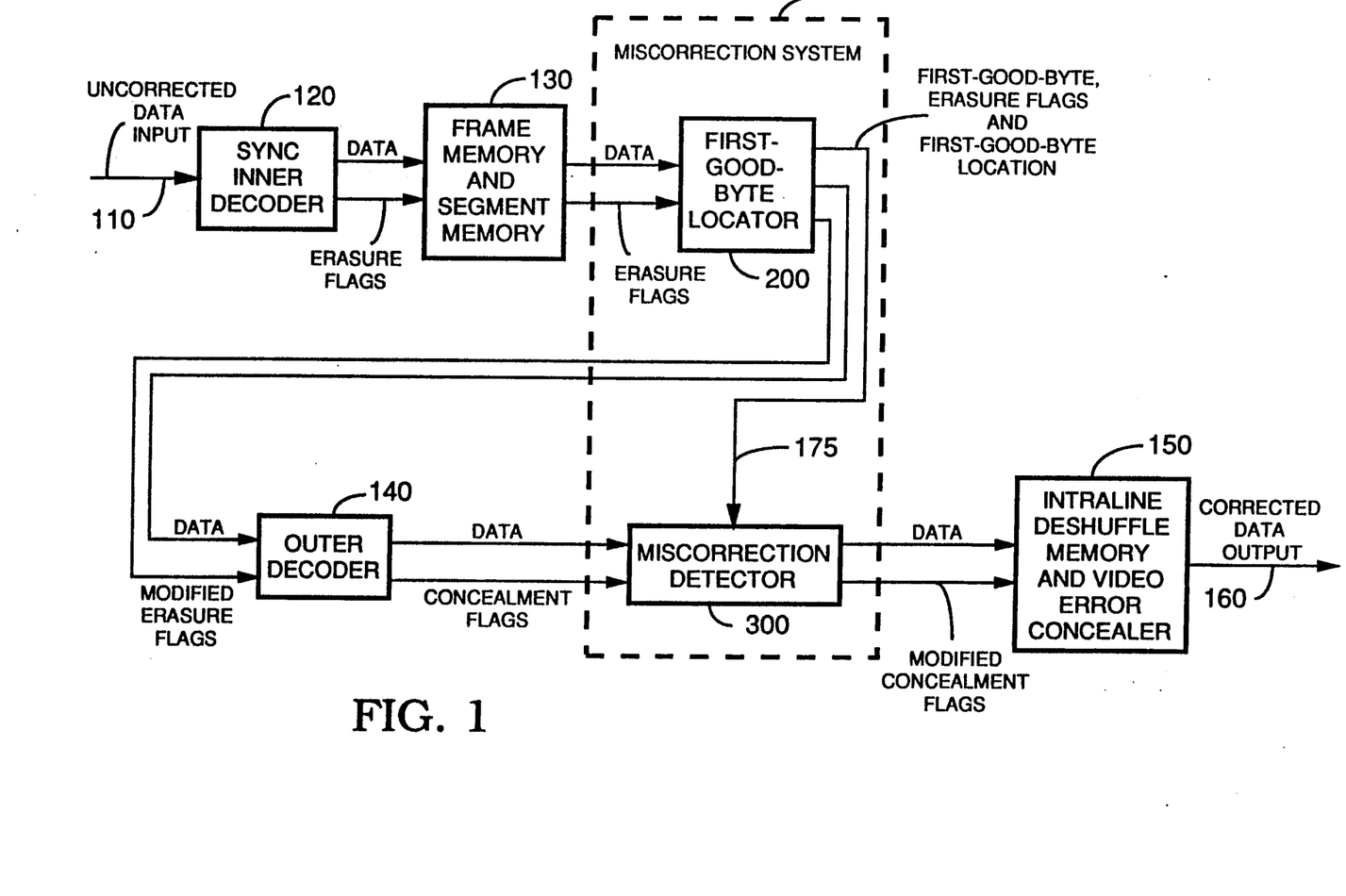
FIG. 1 is a block diagram illustration of a portion of a digital video tape recorder and playback device in which is included a miscorrection system in accordance with the principles of my invention.

Referring to FIG. 1, in a digital audio or video recorder and playback device, a digital signal, for example, a D-2 formatted video digital signal, can be provided over path 110 to synchronization inner decoder 120. Inner decoder 120 detects a synchronization pattern and decodes and corrects the video digital signal using a Reed Solomon code arrangement. Inner decoder 120 also extends erasure flags and the decoded video digital data signal to a frame memory and segment memory 130.

The erasure flag is generated by inner decoder 120 as a flag or signal, which signifies the existence of a first event, to wit: that either an error(s) was not detected in the video digital signal or that an error(s) was detected and was corrected; or the existence of a second event, to wit: that an error(s) was detected and was not corrected in the video digital signal. As an aside, note that the first event is really either of two subevents, which for ease of discussion are discussed as the single first event.

Continuing, the frame memory accepts video data, responsive to synchronization clocking and identification information in the video digital signal, and thereupon buffers the video data so that the video data may be reformatted for outer decoding purposes. Video data can be written into the frame memory and can later be read from the frame memory to the segment memory at the reference clocking rate, for example, at a rate of 2Fsc.

The video data can be read from the segment memory and, in accordance with the principles of my invention, extended to first-good-byte locator 200 of miscorrection system 170.

Now to understand one advantage of miscorrection system 170, recall that the first event signified by the erasure flag is the event that either an error(s) was not detected in the video digital signal or that an error(s) was detected and was corrected. With that in mind, it may be pointed out that, in the event that the non-detection was itself an error, i.e. there was in fact an error that was not detected, also called a misdetection, or in the event the detection and correction was itself an error, i.e. there was in fact an error in the detection and correction process, which lead to the video digital signal being inappropriately corrected, also called a miscorrection, then inner decoder 120 would not have flagged an underlying error in the video data, which would typically give rise to an unflagged error being processed by, and to the degradation of the performance of, the recorder and playback device.

In view of foregoing, and as will shortly be made clear, first-good-byte locator 200 of miscorrection system 170 extends the video data, which it receives from inner decoder 120 by way of frame memory and segment memory 130, and also extends a modified erasure flag, both being extended to outer decoder 140 where the outer code block columns of the video data are processed by an error correction code (ECC) system included in outer decoder 140. After the normal error correction by outer decoder 140, the video data and the corresponding concealment flags are extended to miscorrection detector 300 of miscorrection system 170 for processing in accordance with the principles of my invention.

In addition to the above, and as will also shortly be made more clear, first-good-byte locator 200 of miscorrection system 170 extends both a first good sample of the video data, which, in my illustrative embodiment, and not by way of limitation, will be discussed as being the first byte which is unflagged by inner decoder 120, as well as the location of the first good sample in the video data over cable 175 to miscorrection detector 300 of miscorrection system 170.

Miscorrection detector 300 of miscorrection system 170 compares the first unflagged sample with the video data output of outer decoder 140 after the video data input to outer decoder 140 has been processed by the error correction code system embodied in outer decoder 140. In the event the first unflagged sample provided by locator 200 differs from the video data output provided by outer decoder 140, it is concluded that the video data has an unflagged error. That is, it is concluded that either an undetected error has occurred, which is called a misdetected error, or that an error was detected and inappropriately corrected, which is called a miscorrected error. In either case and in response thereto, the concealment flag is modified and the video data is processed as having an error.

Thereafter, the video data and modified concealment flags are extended from miscorrection system 170 and written into a random access memory (RAM), which may or may not be part of a shuffling or deshuffling process, but for purposes of illustration and not by way of limitation, my description assumes that it is partly a deshuffling process and hence the RAM will be referred to as an intraline deshuffle memory 150. The writing into the RAM occurs in such a sequence that allows for subsequent intraline deshuffling of the video data. Thereafter, the deshuffled, corrected video data and (modified) concealment flags (viz-a-viz erasure flags) for identifying video data that needs to be concealed are extended to a video error concealing device 150 for concealment.

Advantageously, unflagged errors in the video digital signal are processed as flagged errors in the video digital signal, which, when coupled with the known advantages of the concealment of the errors, results in an improved performance of the video recorder and playback device.

Before turning to the details of first-good-byte locator 200 and of miscorrection detector 300, miscorrection system 170 broadly embodies the following methodology. It looks for the first good sample, which, in my illustrative embodiment is assumed, and only by way of illustration and not by way of limitation, to be the first unflagged byte, in a video data block. It saves the value of the first good byte as well as the location of the first good byte in the video data block. It then sets the erasure flag of the first good byte as a flagged error and extends the first good byte, then marked as a flagged error, to the outer decoder 140. Outer decoder 140 has embodied therein a standard Reed Solomon ECC decoding system, which processes the first good byte. At the output of outer decoder 140, the ECC system processed value of the first good byte is compared with the saved value of the first good byte. If the two values of the first good byte are different, a miscorrection is assumed to have occurred within outer decoder 140 and the entire video data block is flagged as being in error. In my illustrative embodiment, an entire block of video data can be flagged as being in error by flagging each byte in the block as being in error. Thereafter, the video error concealing device will process the entire video data block for concealment.

In the ensuing description of an illustrative embodiment of miscorrection system 170, it may be implied that a memory requirement of a size larger than the size of a video data block may be required. Fortuitously, in a Reed Solomon ECC system operated in an erasure correction mode, the correction system will correct that number of errors, which is less than or equal to the number of check bytes that are included in a code word. For example, if the video data block has a length of 64 bytes with 60 bytes of data and four check bytes, then only four erasure flags can be corrected before the ECC system becomes overloaded. Recognizing that constraint, it would only be necessary look for the first good byte, i.e. here assumed to be the first unflagged byte, in the first five byte locations of the video data block being looked at. In view of the foregoing, if a good sample is not located within the first five sampled byte locations, then an overload condition would exist and no correction of a flagged byte would occur and, hence, there would be no miscorrection. Accordingly, only four bytes of memory would be required to check for a miscorrection in this example.

Figure 2:
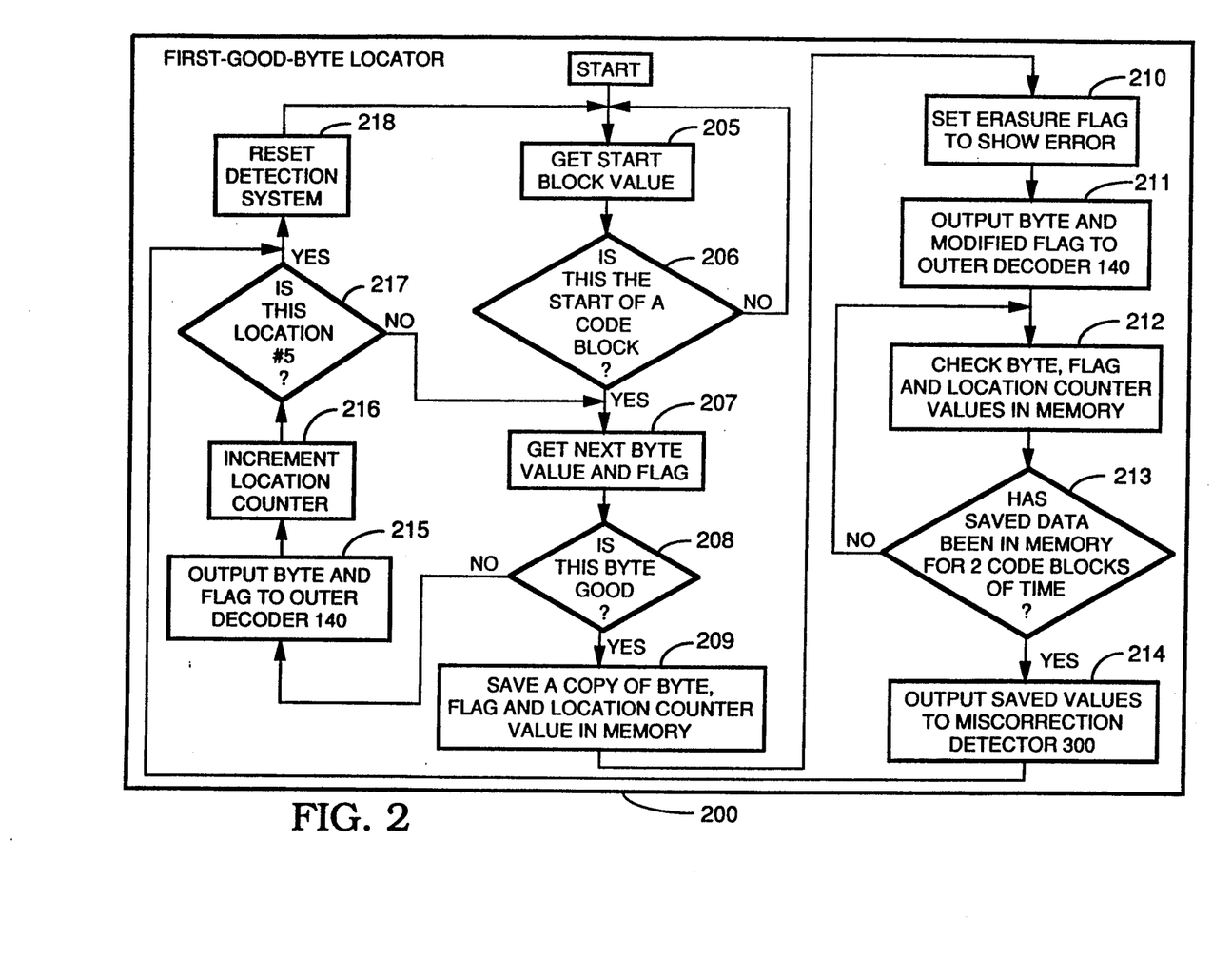
FIG. 2 is a flow chart of a first-good-byte locator, which can be embodied in the miscorrection system shown in FIG. 1 and which is useful in describing the principles of my invention.

Now, referring to FIG. 2, there is shown a flow chart of illustrative logic for inclusion in an illustrative embodiment of first-good-byte locator 200 like that shown in FIG. 1. Upon entry into locator 200, an initializing interactive loop (205, 206) occurs until the first byte (vis-a-vis the first good byte, which may be, but need not be, one and the same byte) of a new video data block is detected. Thereupon, the first byte in the block and its erasure flag are obtained (207). If the byte has already been flagged as being in error, i.e. is a flagged error, it may be extended (215) to outer decoder 140 and the process can iterate through as many of the first five sampled byte locations of the video data block (216, 217) as are needed to locate the first good byte. On the one hand, if a first good byte is not located within the first five bytes (217, 218) of the video data block, then locator 200 is reset for the next video data block. The resetting of locator 200 is done since, as aforedescribed, there would be no misdetection or miscorrection, either of which, for simplicity and not by way of limitation, is referred to as miscorrection in what follows. On the other hand, if a first good byte is found within the five bytes of the video data block (208), then (the value of) the first good byte and its location are saved (209), the erasure flag is modified to identify a flagged error (210), and the first good byte together with the modified erasure flag (211) are extended to outer decoder 140. The above information is saved for a time interval corresponding to the time interval of two video data code blocks (212, 213) whereupon the value of the first good byte as well as its location are extended (214) from locator 200 over cable 175 to miscorrection detector 300, and then locator 200 is reset (218). The delay of two video data code block time intervals has been experimentally found to compensate for the time delay typically found in Reed Solomon ECC decoding systems.

Figure 3:
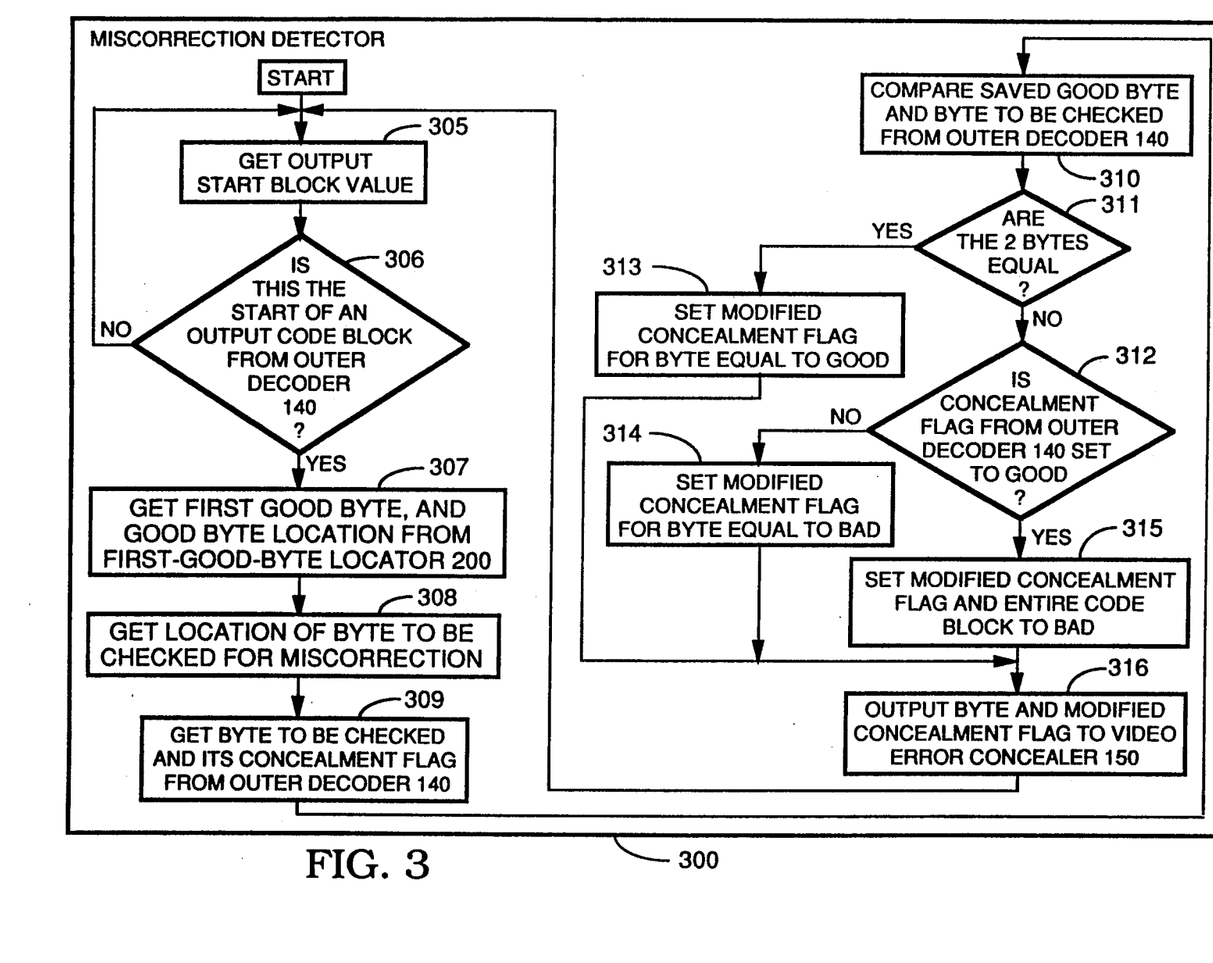
FIG. 3 is a flow chart of a miscorrection detector, which can be embodied in the miscorrection system shown in FIG. 1 and which is useful in describing the principles of my invention.

Now, referring to FIG. 3, there is shown a flow chart of illustrative logic for inclusion in an illustrative embodiment of miscorrection detector 300 like that shown in FIG. 1. Upon entry into miscorrection detector 300, an initializing interactive loop (305, 306) occurs until the first byte (vis-a-vis the first good byte, which may be, but need not be, one and the same byte) of a new video data block from outer decoder 140 is detected. Thereupon, the first good byte in the block and its location are obtained (307) from first good byte locator 200 over cable 175. Also, the byte to be checked for miscorrection, its concealment flag, and its location (308, 309) are obtained from outer decoder 140 and the video data block. The first good byte and the byte to be checked for miscorrection are compared (310). On the one hand, if the compared bytes are the same, then the (modified) concealment flag of the byte is set (313) to the value of the erasure flag of the first good byte, which, of course, means that the concealment flag is set to a "good" value. Also, if the compared bytes are not the same and if the concealment flag of the byte to be checked from outer decoder 140 is not set to a "good" value, but rather is set to a "bad" value, i.e. is set to a "conceal the byte" value, then the (modified) concealment flag of the byte is set (314) to the value of the concealment flag of the byte to be checked, which, of course, means that there is no change to that concealment flag, which remains with a "bad" value. On the other hand, if the compared bytes are not the same and if the concealment flag of the byte to be checked from outer decoder 140 is set to a "good" value, i.e. is set to a "do not conceal the byte" value, then the (modified) concealment flag of each byte in the video data block, which in my illustrative embodiment corresponds to the flag for the entire block, is set (315) to a "bad" value. Such an event is intended to be interpreted to mean that the byte to be checked has an error and that each byte in the errored block should be concealed. Such an event also means that there is a change to the concealment flag for one or more bytes, which comprise the video data block. In either case, the (modified) concealment flag, whether or not modified in fact, together with the byte to be checked from outer decoder 140 are extended (316) to video concealer 150 for concealment or non-concealment processing.

Figure 4:
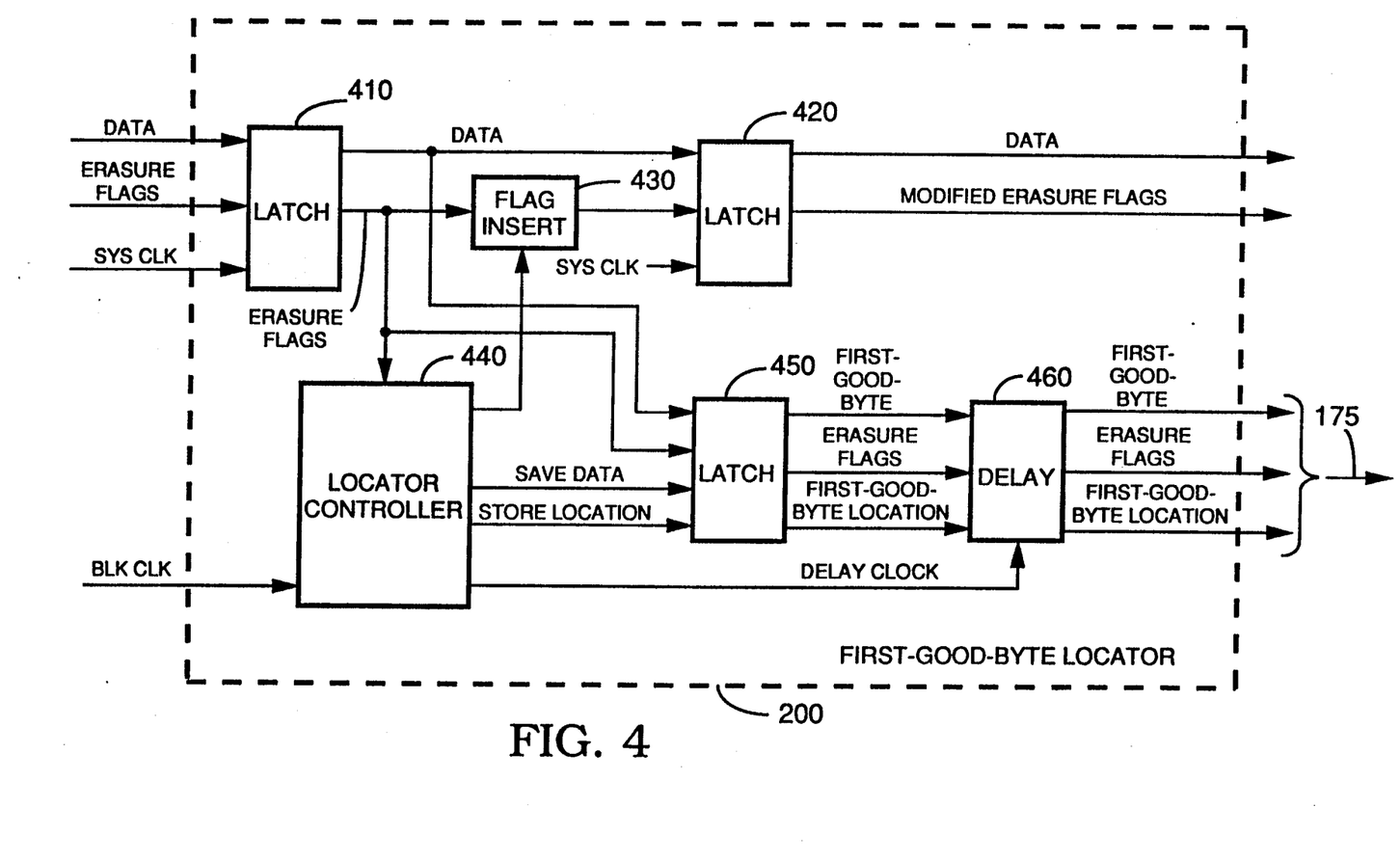
FIG. 4 is a block diagram of a first-good-byte locator, which can be an embodiment of the first-good-byte locator illustrated in FIG. 2 and which can be embodied in the miscorrection system shown in FIG. 1 and which is useful in describing the principles of my invention.

Now, referring to FIG. 4, there is shown a block diagram of an illustrative embodiment of first-good-byte locator 200 like that shown in FIGS. 1 and 2. A person skilled in the art can, in a straightforward manner, use the prior description relating to the logic of FIG. 2 to construct and embody that logic in a digital hardware embodiment thereof. To assist in that transition, a description showing the correlation between the flow chart logic of first-good-byte locator 200 illustrated in FIG. 2 and the block diagram of a hardware embodiment of first-good-byte locator 200 illustrated in FIG. 4 is now provided. Specifically, flow chart logic functions 205, 206, 208, 216, 217, and 218 can be embodied in block diagram locator controller function 440. Flow chart logic function 207 can be embodied in block diagram latch function 410. Flow chart logic functions 211 and 215 can be embodied in block diagram latch function 420. The combination of latches 410 and 420 function as, what is known in the art as, a two stage pipeline introducing appropriate delay in the digital data being processed by locator 200. Flow chart logic function 209 can be embodied in block diagram latch function 450. Flow chart logic function 210 can be embodied in block diagram flag insert function 430. Flow chart logic functions 212, 213, and 214 can be embodied in block diagram two stage delay function 460, the output of which are the first-good-byte, its location and its erasure flag, which are extended over cable 175 to miscorrection detector 300.

Figure 5:
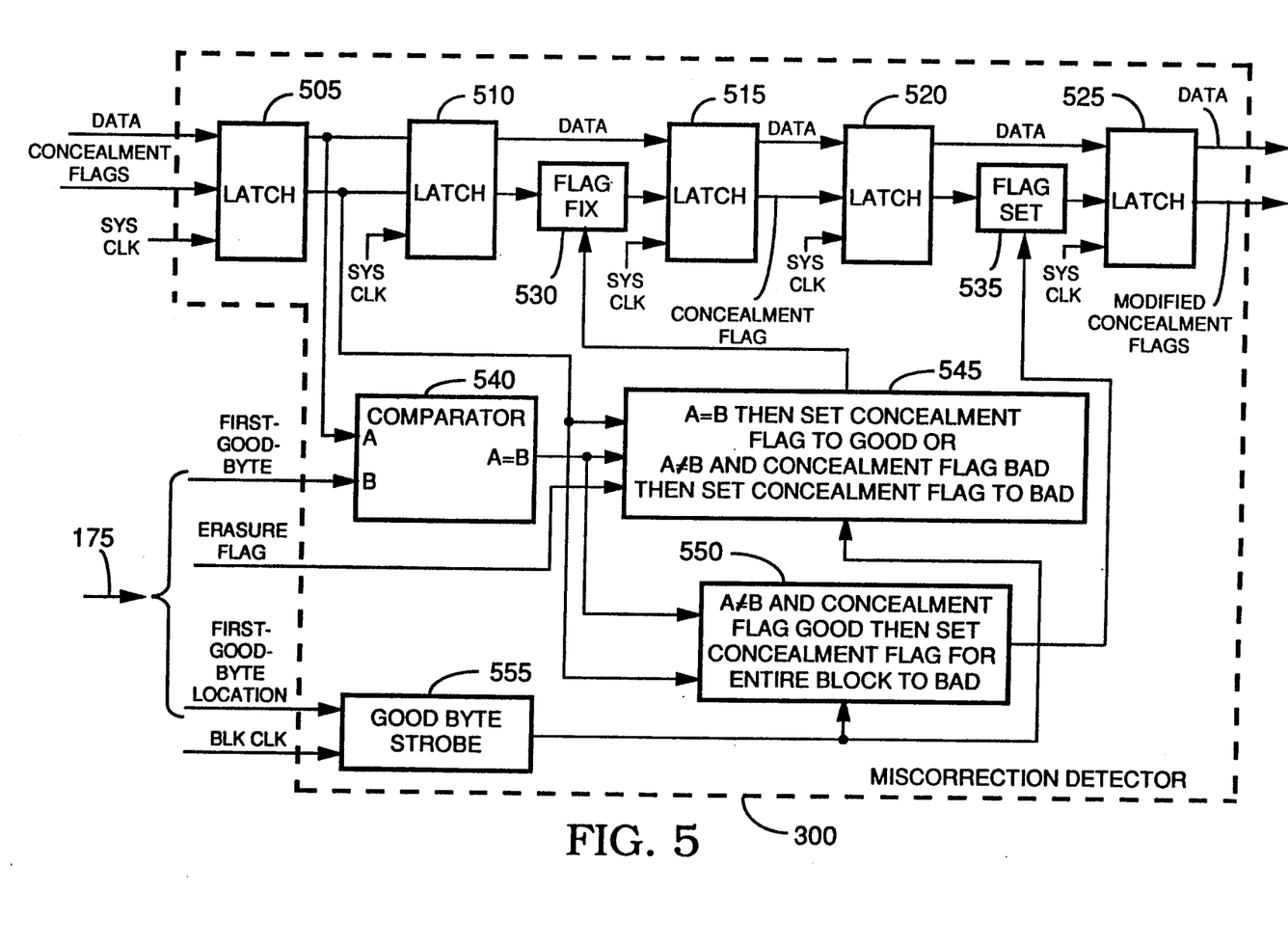
FIG. 5 is a block diagram of a miscorrection detector, which can be an embodiment of the miscorrection detector illustrated in FIG. 3 and which can be embodied in the miscorrection system shown in FIG. 1 and which is useful in describing the principles of my invention.

Now, referring to FIG. 5, there is shown a block diagram of an illustrative embodiment of miscorrection detector 300 like that shown in FIGS. 1 and 3. A person skilled in the art can, in a straightforward manner, use the prior description relating to the logic of FIG. 3 to construct and embody that logic in a digital hardware embodiment thereof. To assist in that transition, a description showing the correlation between the flow chart logic miscorrection detector 300 illustrated in FIG. 3 and the block diagram of a hardware embodiment of miscorrection detector 300 illustrated in FIG. 5 is now provided. Specifically, the first-good-byte, its location and its erasure flag are extended over cable 175 from first-byte locator 200 to miscorrection detector 300. Thereupon, flow chart logic functions 305, 306, 307, 308, and 309 of FIG. 3 can be embodied in block diagram four stage pipeline functions 505, 510, 515, and 520 as well as in block diagram good byte strobe function 555 of FIG. 5. Flow chart logic function 310 can be embodied in block diagram comparator function 540. Flow chart logic functions 311, 312, 313, and 314 can be embodied in block diagram functions 530 and 545, when the comparison function shows equality or when the comparison function shows inequality and the concealment flag is set to a "bad" value. Flow chart logic functions 312, 315, and 316 can be embodied in block diagram functions 525, 535, and 550, when the comparison function shows inequality and the concealment flag is set to a "good" value.

The foregoing description of the principles of my invention is by way of illustration only and not by way of limitation. For example, although several illustrative embodiments of a miscorrection system in accordance with the principles of my invention have been shown and described, other alternative embodiments are possible and would be clear to one skilled in the art upon an understanding of the principles of my invention. Certainly the principles of my invention have utility apart from video tape playback devices. For example, any apparatus such as an audio or video tape recorder device or an audio or video transmission channel, which could potentially introduce errors in the data and wherein it is desireable to conceal errors, could benefit from the application of the principles of my invention. Accordingly, the scope of my invention is to be limited only by the appended claims.

What is claimed is:

1. A method of concealing digital data, the method including the steps of:
    checking a digital data signal for errors;
    responsive to a detected error in the digital data, generating a corresponding erasure flag for indicating whether or not the detected error is to be corrected;
    responsive to an erasure flag, generating a corresponding concealment flag for indicating whether or not the digital data is to be concealed;
    extending the digital data and concealment flag to an error concealer; and
    wherein the improvement comprises the steps of:
        detecting an unflagged error in the digital data and responsive to a detected unflagged error in the digital data, modifying the concealment flag of the digital data; and
        wherein the step of detecting an unflagged error in the digital data further comprises the steps of:
            detecting a first-good sample in the digital data;
            setting the erasure flag of the first-good sample to indicate that the first-good sample is to be treated as including a detected error;
            extending the first-good sample to an error correcting code (ECC) system and to a miscorrection detector;
            comparing the first-good sample with a corresponding sample from an output of the ECC system.

2. The method defined in claim 1 wherein the step of detecting an unflagged error in the digital data further comprises the step of:
    responsive to the comparison of the first-good sample and the corresponding sample output of the ECC system indicating the compared samples to be the same, modifying the concealment flag of the first-good sample to a "good" value.

3. The method defined in claim 1 wherein the step of detecting an unflagged error in the digital data further comprises the step of:
    responsive to the comparison of the first-good sample and the corresponding sample output of the ECC system indicating the compared samples are not the same and responsive to the concealment flag of the corresponding sample output of the ECC system indicating the sample output to be a "bad" value, modifying the concealment flag of the first-good sample to a "bad" value.

4. The method defined in claim 1 wherein the step of detecting an unflagged error in the digital data further comprises the step of:

responsive to the comparison of the first-good sample and the corresponding sample output of the ECC system indicating the compared samples are not the same and responsive to the concealment flag of the corresponding sample output of the ECC system indicating the sample output to be a "good" value, modifying the concealment flag of the block including the first-good sample to a "bad" value.

5. The method defined in claims 1, 2, 3 or 4 further comprising the step of:

responsive to the modified concealment flag, concealing the unflagged error in the digital data.

6. Apparatus for concealing digital data, the apparatus including:

means for checking a digital data signal for errors;

means, responsive to a detected error in the digital data, for generating a corresponding erasure flag for indicating whether or not the detected error is to be corrected;

means, responsive to an erasure flag, for generating a corresponding concealment flag for indicating whether or not the digital data is to be concealed;

means extending the digital data and concealment flag to an error concealer; and wherein the improvement comprises:

means for detecting an unflagged error in the digital data; and means, responsive to a detected unflagged error in the digital data, for modifying the concealment flag of the digital data; and wherein the means for detecting an unflagged error in the digital data further comprises:

means for detecting the first-good sample of digital data;

means for setting the erasure flag of the first-good sample to indicate that the first-good sample is to be treated as including a detected error;

means for extending the first-good sample to an ECC system and to a miscorrection detector; and means for comparing the first-good sample with a corresponding sample from an output of the ECC system.

7. The apparatus defined in claim 6 wherein the means for detecting an unflagged error in the digital data further comprises:

means, responsive to the comparison of the first-good sample and the corresponding sample output of the ECC system indicating the compared samples to be the same, for modifying the concealment flag of the first-good sample to a "good" value.

8. The apparatus defined in claim 6 wherein the means for detecting an unflagged error in the digital data further comprises:

means, responsive to the comparison of the first-good sample and the corresponding sample output of the ECC system indicating the compared samples are not the same and responsive to the concealment flag of the corresponding sample output of the ECC system indicating the sample output to be a "bad" value, for modifying the concealment flag of the first-good sample to a "bad" value.

9. The apparatus defined in claim 6 wherein the means for detecting an unflagged error in the digital data further comprises:

means, responsive to the comparison of the first-good sample and the corresponding sample output of the ECC system indicating the compared samples are not the same and responsive to the concealment flag of the corresponding sample output of the ECC system indicating the sample output to be a "good" value, for modifying the concealment flag of the block including the first-good sample to a "bad" value.

10. The apparatus defined in claims 6, 7, 8, or 9 further comprising:

means, responsive to the modified concealment flag, for concealing the unflagged error in the digital data.

11. A system for concealing digital data, the system including:

means for checking a digital data signal for errors;

means, responsive to a detected error in the digital data, for generating a corresponding erasure flag for indicating whether or not the detected error is to be corrected;

means, responsive to an erasure flag, for generating a corresponding concealment flag for indicating whether or not the digital data is to be concealed;

means extending the digital data and concealment flag to an error concealer; and wherein the improvement comprises:

means for detecting an unflagged error in the digital data and means, responsive to a detected unflagged error in the digital data, for modifying the concealment flag of the digital data; and wherein the means for detecting an unflagged error in the digital data further comprises:

means for detecting the first-good sample of digital data;

means for setting the erasure flag of the first-good sample to indicate that the first-good sample is to be treated as including a detected error;

means for extending the first-good sample to an ECC system and to a miscorrection detector; and means for comparing the first-good sample with a corresponding sample from an output of the ECC system.

12. The system defined in claim 11 wherein the means for detecting an unflagged error in the digital data further comprises:

means, responsive to the comparison of the first-good sample and the corresponding sample output of the ECC system indicating the compared samples to be the same, for modifying the concealment flag of the first-good sample to a "good" value.

13. The system defined in claim 11 wherein the means for detecting an unflagged error in the digital data further comprises:

means, responsive to the comparison of the first-good sample and the sample output of the ECC system indicating the compared samples are not the same and responsive to the concealment flag of the corresponding sample output of the ECC system indicating the sample output to be a "bad" value, for modifying the concealment flag of the first-good sample to a "bad" value.

14. The system defined in claim 11 wherein the means for detecting an unflagged error in the digital data further comprises:

means, responsive to the comparison of the first-good sample and the sample output of the ECC system indicating the compared samples are not the same and responsive to the concealment flag of the corresponding sample output of the ECC system indicating the sample output to be a "good" value, for modifying the concealment flag of the block including the first-good sample to a "bad" value.

15. The system defined in claims 11, 12, 13 or 14 further comprising:
   means, responsive to the modified concealment flag, for concealing the unflagged error in the digital data.

16. A method of concealing digital data, the method including the steps of:
   responsive to a digital data signal and responsive to an erasure flag for indicating whether or not an error in the digital signal data is to be corrected and responsive to a concealment flag for indicating whether or not the digital data is to be concealed, generating a modified concealment flag, the generating step comprising the steps of:
   detecting a first-good sample in the digital data;
   setting the erasure flag of the first-good sample to indicate that the first-good sample is to be treated as including a detected error;
   extending the first-good sample to an error correcting code (ECC) system and to a miscorrection detector, the miscorrection detector being adapted for comparing samples;
   comparing the first-good sample with a corresponding sample from an output of the ECC system; and
   responsive to the compared samples, modifying the concealment flag of the digital data
   extending the digital data and the modified concealment flag to an error concealer for concealment.

17. The method defined in claim 16 wherein the step of modifying the concealment flag of the digital data further comprises the step of:
   responsive to the comparison of the first-good sample and the corresponding sample output of the ECC system indicating the compared samples to be the same, modifying the concealment flag of the first-good sample to a "good" value.

18. The method defined in claim 16 wherein the step of modifying the concealment flag of the digital data further comprises the step of:
   responsive to the comparison of the first-good sample and the corresponding sample output of the ECC system indicating the compared samples are not the same and responsive to the concealment flag of the corresponding sample output of the ECC system indicating the sample output to be a "bad" value, modifying the concealment flag of the first-good sample to a "bad" value.

19. The method defined in claim 16 wherein the step of modifying the concealment flag of the digital data further comprises the step of:
   responsive to the comparison of the first-good sample and the corresponding sample output of the ECC system indicating the compared samples are not the same and responsive to the concealment flag of the corresponding sample output of the ECC system indicating the sample output to be a "good" value, modifying the concealment flag of the block including the first-good sample to a "bad" value.

20. Apparatus for concealing digital data comprising:
   means, responsive to a digital data signal and responsive to an erasure flag for indicating whether or not an error is to be corrected and responsive to a concealment flag for indicating whether or not the digital data is to be concealed, for generating a modified concealment flag for indicating whether or not the digital data is to be concealed, the generating means comprising:
   means for detecting a first-good sample in the digital data; means for setting the erasure flag of the first-good sample to indicate that the first-good sample is to be treated as including a detected error;
   means for extending the first-good sample to an error correcting code (ECC) system and to a miscorrection detector, the miscorrection detector including means for comparing the first-good sample with a corresponding sample from an output of the ECC system; and
   means, responsive to the compared samples, for modifying the concealment flag of the digital data; and
   means for extending the digital data and the modified concealment flag to an error concealer.

* * * * *